United States Patent [19]

Ashiba

[11] Patent Number: 5,035,306
[45] Date of Patent: Jul. 30, 1991

[54] ADJUSTABLE DAMPING FORCE HYDRAULIC SHOCK ABSORBER

[75] Inventor: Masahiro Ashiba, Kanagawa, Japan

[73] Assignee: Tokico Ltd., Kanagawa, Japan

[21] Appl. No.: 450,919

[22] Filed: Dec. 14, 1989

[30] Foreign Application Priority Data

Dec. 14, 1988 [JP] Japan .................... 63-315921

[51] Int. Cl.$^5$ ............................................. F16F 9/34
[52] U.S. Cl. .................................... 188/299; 188/319; 251/65; 251/282; 280/714
[58] Field of Search ................... 188/299, 319, 322.15; 280/714; 251/65, 282

[56] References Cited

U.S. PATENT DOCUMENTS

| | | | |
|---|---|---|---|
| 1,090,902 | 3/1914 | Beckwith | 251/65 X |
| 2,579,723 | 12/1951 | Best | 251/65 |
| 3,379,214 | 4/1968 | Weinberg | 251/65 X |
| 3,756,558 | 9/1973 | Okui | 251/282 |
| 4,664,150 | 5/1987 | Steiger | 251/65 X |
| 4,681,143 | 7/1987 | Sato et al. | 188/299 X |
| 4,723,640 | 2/1988 | Beck . | |
| 4,785,920 | 11/1988 | Knecht et al. | 188/299 |
| 4,836,342 | 6/1989 | Wolfe | 251/282 X |
| 4,854,429 | 8/1989 | Casey | 188/299 |

FOREIGN PATENT DOCUMENTS

| | | | |
|---|---|---|---|
| 59-22359 | 7/1984 | Japan . | |
| 60-37477 | 11/1985 | Japan . | |
| 379806 | 7/1973 | U.S.S.R. | 251/65 |
| 2017266 | 10/1979 | United Kingdom | 251/282 |

Primary Examiner—George E. A. Halvosa
Attorney, Agent, or Firm—Wenderoth, Lind & Ponack

[57] ABSTRACT

An adjustable damping force hydraulic shock absorber comprising a cylinder, a piston partitioning the interior of the cylinder into two chambers, a plurality of passages through which working fluid contained in the cylinder flows when the piston axially moves in the cylinder, a damping force generating mechanism for generating a damping force by controlling the flow of the working fluid through the passages, and a damping force regulating valve capable of regulating the damping force by opening or closing one specific passage of the plurality of passages. The present invention provides a shock absorber of the aforementioned type which is characterized in that the damping force regulating valve comprises an axially movable valve element having one end in contact with a valve seat formed in the specific passage when the valve element is seated on the valve seat to block the flow of the working fluid through the specific passage between the two chambers, the valve element being such designed as to define a space on the side of the other end thereof, the space communicating with the side of the one end, a plunger attached to the other end of the valve element, the plunger being formed of a magnetic material, a solenoid axially slidably receiving the plunger, and capable of axially moving the plunger when energized, and a permanent magnet for holding the plunger at a position to which the plunger has been moved, and that the valve element is formed so that the remainder of a subtraction of the pressure receiving area thereof receiving the pressure in one of the chambers in an opening direction from the pressure receiving area thereof receiving the pressure in the same chamber in a closing direction is zero or a positive value, and the remainder of a subtraction of the pressure receiving area thereof receiving the pressure in the other chamber in an opneing direction from the pressure receiving area thereof receiving the pressure in the same chamber in a closing direction is zero or a positive value, when the valve element is seated on the valve seat.

8 Claims, 5 Drawing Sheets

ADJUSTABLE DAMPING FORCE HYDRAULIC SHOCK ABSORBER

BACKGROUND OF THE INVENTION

1. Field of the Invention

The present invention relates to an adjustable damping force shock absorber for a vehicle or the like, capable of varying the damping force in accordance with road conditions while the vehicle is running.

2. Description of the Prior Art

Hydraulic shock absorbers for vehicles or the like, capable of properly varying the damping force according to the road conditions to ensure a satisfactory ride and stable control are disclosed in, for example, Japanese Patent Publication Nos. 59-22359 and 60-37477. Such an adjustable damping force shock absorber has a cylinder having two chambers partitioned by a piston and communicating with each other by means of a plurality of passages. The shock absorber is provided with damping force generating means such as orifices which control the flow of the working fluid through the passages caused by the axial movement of a piston in a cylinder to produce a damping force, and varies its damping force by selectively opening or closing the passages by means of solenoid valves. Each of the solenoid valves is a normally closed valve having a valve element normally biased to a closed position by a coil spring or the like to keep the passage closed. The solenoid is energized to move the valve element away from the closed position against the resilience of the coil spring by magnetic attraction to open the passage.

This known adjustable damping force hydraulic shock absorber, however, has the following problems.

As for the foregoing known adjustable damping force hydraulic shock absorber, the pressure of the working fluid acts directly on the valve element. Therefore, the valve element must be biased to the closed position by a comparatively strong coil spring or the like, and hence the solenoid must be large and must be capable of exerting a high degree of attraction on the valve element, which increases the overall size of the hydraulic shock absorber. Furthermore, since the solenoid must be continually energized when keeping the solenoid valve open, power consumption is increased, the load on the battery increases, and heat generated by the solenoids of the solenoid valves accelerates the deterioration of the working fluid sealed in the hydraulic shock absorber.

SUMMARY OF THE INVENTION

Accordingly, it is an object of the present invention to provide an adjustable damping force hydraulic shock absorber incorporating solenoid valves each having a comparatively small solenoid having a comparatively small capacity, and capable of operating at a reduced power consumption.

In one aspect of the present invention, an adjustable damping force hydraulic shock absorber comprises a cylinder, a piston fitted in the cylinder for axial movement and partitioning the interior of the cylinder into two chambers, a plurality of passages through which working fluid contained in the cylinder flows when the piston moves in the cylinder, damping force generating means for generating a damping force by controlling the flow of the working fluid through the passages, and is characterized by a damping force regulating valve for regulating the damping force by opening or closing one specific passage of the plurality of passages. The damping force regulating valve comprises a valve seat, a valve element having one end to be seated on the valve seat to block the flow of the working fluid through the associated passage, the valve element being designed such as to define a space on the side of the other end thereof, the space communicating with the side of the one end of the valve element, a plunger formed of a magnetic material, attached to the valve element, a solenoid combined with the plunger to move the plunger when energized, and a permanent magnet to hold the plunger at a position to which the plunger has been moved. The valve element is formed so that the pressure receiving area of a surface thereof receiving the pressure in one of the chambers in an opening direction is less than or equal to the pressure receiving area of a surface thereof receiving the pressure in the same chamber in a closing direction, and the pressure receiving area of a surface thereof receiving the pressure in the other chamber in an opening direction is less than or equal to the pressure receiving area of a surface thereof receiving the pressure in the same chamber in a closing direction, when the valve element is seated on the valve seat.

In another aspect of the present invention, an adjustable damping force hydraulic shock absorber comprises a cylinder, a piston fitted in the cylinder for axial movement and partitioning the interior of the cylinder into two chambers, a plurality of passages through which working fluid contained in the cylinder flows when the piston moves in the cylinder, and damping force generating means for generating a damping force by controlling the flow of the working fluid through the plurality of passages, and is characterized by a damping force regulating valve for regulating the damping force by opening or closing one specific passage of the plurality of passages. The damping force regulating valve comprises an axially movable valve element to be seated on a valve seat formed in the specific passage to close the specific passage and to be raised from the valve seat to open the specific passage, a plunger formed of a magnetic material, attached to the valve element, a solenoid combined with the plunger to move the plunger when energized, and a permanent magnet which holds the plunger at a position to which the plunger has been moved.

In a further aspect of the present invention, an adjustable damping force hydraulic shock absorber comprises a cylinder, a piston fitted in the cylinder for axial movement and partitioning the interior of the cylinder into two chambers, a plurality of passages through which working fluid contained in the cylinder flows when the piston moves in the cylinder, and damping force generating means for generating a damping force by controlling the flow of the working fluid through the passages, and is characterized by a damping force regulating valve for regulating the damping force by opening or closing one specific passage of the plurality of passages. The damping force regulating valve is an electromagnetic valve having a valve element which is moved axially by energizing the valve. The valve element has a cylindrical shape, closes the specific passage when one end thereof is seated on a valve seat formed within the specific passage, the valve element being designed such as to define a space on the side of the other end thereof, the space communicating with the side of the one end of the valve element, the valve element being formed so that the area of the valve element receiving the pressure in one of the chambers in an opening direction from the area of the valve element receiving the pressure in the same chamber in a closing direction, and the area of the valve element receiving the pressure in the other chamber in an opening direction is less than or equal to the area of the valve element receiving the pressure in the same chamber in a closing direction is zero or a positive value, when the valve element is seated on the valve seat.

The valve element is seated on or raised from the valve seat by moving the plunger attached to the valve element by the cooperative action of a magnetic field created by energizing the solenoid and a magnetic field created by the permanent magnet to close or open the specific passage for damping force regulation. Even if the solenoid is de-energized after moving the plunger to a certain position, the plunger is held at the same position by the magnetic field of the permanent magnet to keep the valve element at the opening position or the closing position.

Since the valve element is formed so that the area of the valve element receiving the pressure in the chamber in a closing direction is less than or equal to the area of the valve element receiving the pressure in the chamber in an opening direction when the valve element is seated on the valve seat, a force acting on the valve element in a closing direction and a force acting on the valve element in an opening direction cancel out or only a force biasing the valve element in the closing direction acts on the valve element regardless of an increase in pressure in the chambers. Accordingly, the valve element is never accidentally raised from the valve seat.

Since the valve element can be held at the opened position or the closed position even if the solenoid is de-energized, the normally closed or normally opened solenoid valve is able to operate with a reduced rate of power consumption. Furthermore, even if the solenoid valve employs a coil spring to keep the valve element seated on the valve seat, the coil spring may be relatively weak, and hence the solenoid only requires a low level of power to raise the valve element from the valve seat.

When the solenoid valve is of a normally open type, the solenoid valve is able to be kept closed with little consumption of power.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENTS

Figure 1:
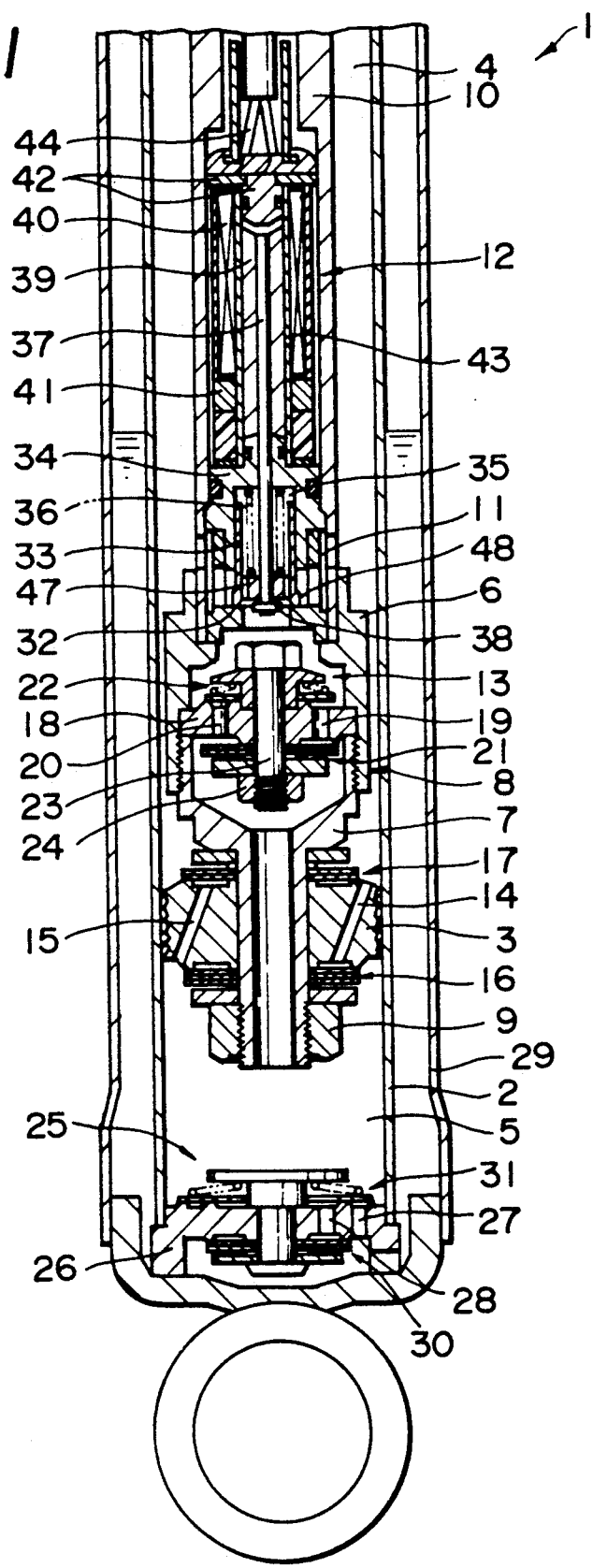
FIG. 1 is a longitudinal sectional view of a variable damping force hydraulic shock absorber in a first embodiment according to the present invention.

Referring to FIG. 1, an adjustable damping force hydraulic shock absorber (hereinafter, referred to simply as "hydraulic shock absorber") 1 in a first embodiment according to the present invention is of a double cylinder type having an inner cylinder 2, an outer cylinder 29 and a piston 3 slidably fitted in the inner cylinder 2 and partitioning the interior of the inner cylinder 2 into an upper chamber 4 and a lower chamber 5. A passage unit 8 comprises a larger cylindrical member 6, and a smaller cylindrical member 7 having a diameter smaller than that of the larger cylindrical member 6 and screwed onto the larger cylindrical member 6. The piston 3 is put on and fastened to the smaller cylindrical member 7 with a nut 9. A piston rod 10 has one end, not shown, projecting from the inner cylinder 2 and the other end screwed into the larger cylindrical member 6 of the passage unit 8. The piston rod 10 is formed of a magnetic material and is provided with a passage 11 by means of which the interior of the passage unit 8 communicates with the upper chamber 4. The passage 11 is opened or closed by a damping force regulating valve 12, which will be described afterward. The interior of the passage unit 8, and the passage 11 of the piston rod 10 forms a bypass passage 13 connecting the upper chamber 4 and the lower chamber 5.

The piston 3 is provided with a first extension passage 14 and a first contraction passage 15. A first damping force generating mechanism 16 which generates a damping force by controlling the flow of the working fluid during the extension stroke of the hydraulic shock absorber 1 is provided near the first extension passage 14 on the side of the lower chamber 5. The first damping force generating mechanism 16 comprises a disk valve and an orifice. A second damping force generating mechanism 17 which generates a damping force by controlling the flow of the working fluid during the contraction stroke of the hydraulic shock absorber 1 is provided near the first contraction passage 15 on the side of the upper chamber 4. The second damping force generating mechanism 17 comprises a disk valve.

A partition member 18 is fitted in the passage unit 8 to close the bypass passage 13 by separating the interior of the larger cylindrical member 6 and that of the smaller cylindrical member 7. The partition member 18 is provided with a second extension passage 19 and a second contraction passage 20, by means of which the interior of the larger cylindrical member 6 and that of the smaller cylindrical member 7 are able to communicate with each other. A third damping force generating mechanism 21 is provided in the interior of the smaller cylindrical member 7 near the second extension passage 19 to generate a damping force by controlling the flow of the working fluid in the extension stroke of the hydraulic shock absorber 1. The third damping force generating mechanism 21 comprises a disk valve and an orifice passage. A check valve 22 is provided in the interior of the larger cylindrical member 6 near the second contraction passage 20 to allow the working fluid to flow from the interior of the smaller cylindrical member 7 into the interior of the larger cylindrical member 6 and to block the reverse flow of the working fluid. A differential pressure necessary to open the disk valve of the third damping force generating mechanism 21 provided near the second extension passage 19 of the partition member 18 is smaller than that necessary for opening the disk valve of the first damping force generating mechanism 16 provided on the piston 3 in combination with the first extension passage 14. The third damping force generating mechanism 21 and the check valve 22 are fastened to the partition member 18 with a bolt 23 and a nut 24.

A bottom valve mechanism 25 is provided on the lower end of the inner cylinder 2 to generate a damping force in the contraction stroke. The bottom valve mechanism 25 comprises a valve body 26 separating the interior of the inner cylinder 2 and that of the outer cylinder 29 and provided with a third extension passage 27 and a third contraction passage 28, a fourth damping force generating mechanism 30 provided near the third contraction passage 28 on the side of the outer cylinder 29 to control the flow of the working fluid in the contraction stroke, and a check valve 31 provided near the third extension passage 27 on the side of the inner cylinder 2 to allow the flow of the working fluid from the outer cylinder 29 into the inner cylinder 2 and to block the reverse flow. The fourth damping force generating mechanism 30 comprises a disk valve and an orifice passage.

The damping force regulating valve 12, which is an essential component of the hydraulic shock absorber 1 of the present invention, will be described hereinafter.

Figure 2:
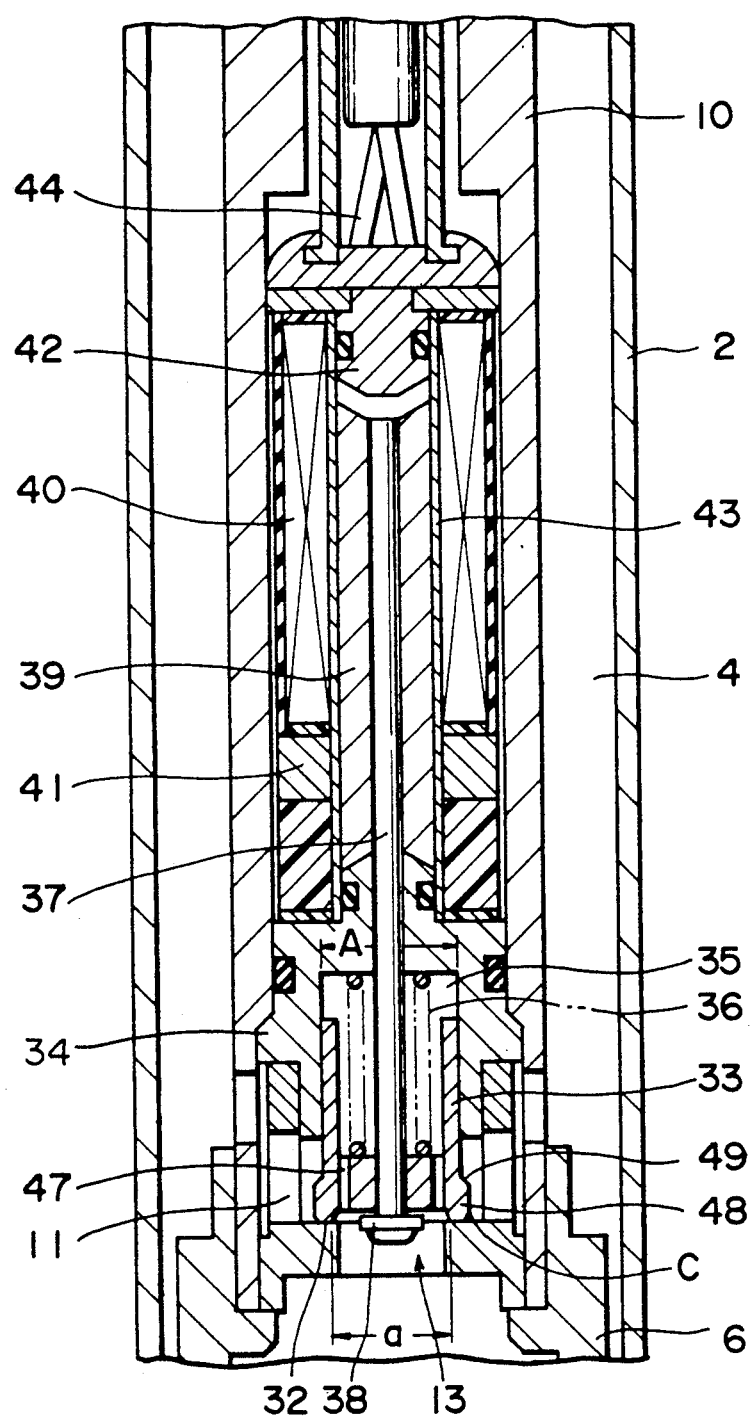
FIG. 2 is an enlarged longitudinal sectional view of a damping force regulating valve incorporated into the variable damping force hydraulic shock absorber of FIG. 1.

Referring to FIG. 2, a valve seat 32 is provided in the passage 11 formed in the piston rod 10, and a cylindrical valve element 33, which is preferably formed of a magnetic material, for opening or closing the bypass passage 13 in cooperation with the valve seat 32 is fitted in a support member 34 for axial movement along the axis of the piston rod 10. The support member 34 is formed of a magnetic material. A spring 36 is provided in a space 35 defined by the valve element 33 and the support member 34 to continuously bias the valve element 33 toward the valve seat 32. A nonmagnetic rod 37 extends through the valve element 33 so that the valve element 33 is slidable along the rod 37. A retaining means comprising a washer 38 attached to the lower end of the rod 37 engages the lower surface of the valve element 33 to raise the valve element 33 when the rod 37 is raised.

The rod 37 extends axially of the piston rod 10 through the support member 34. A plunger 39 formed of a magnetic material is attached to the upper portion of the rod 37. A solenoid 40 and an annular permanent magnet 41 are mounted on a sleeve 43. The plunger 39 is fitted in the sleeve 43 for axial movement. The inner circumference and outer circumference of the permanent magnet 41 are the S pole and N pole of the same respectively. A base member 42 formed of a magnetic material and the support member 34 are fitted respectively in the upper and lower ends of the sleeve 43 in a liquid-tight manner. The axial movement of the plunger 39 is limited by the support member 34 and the base 42. Lead wires 44 extending from the opposite ends of the solenoid 40 and fastened to the upper surface of the base 42 by resin-molding, are extended through the piston rod 10, and are connected through a selector switch 45 provided outside the hydraulic shock absorber 1 to a battery 46.

The valve element 33 is provided with a through hole 47 connecting a space 35 defined by the valve element 33, support member 34, and the bypass passage 13. The working fluid flows through the through hole 47 into the space 35. When the valve element 33 is seated on the valve seat 32, the internal pressure of the lower chamber 5 acts on the opposite sides of the valve element 33. The valve element is formed so that the area a of an opening pressure receiving surface, namely, a surface on which the internal pressure of the lower chamber 5 acts to raise the valve element 33 is less than or equal to the valve seat 32, from the area A of a closing pressure receiving surface, namely, a surface on which the internal pressure of the lower chamber 5 acts to press the valve element 33 onto the valve seat 32.

An expanded part 48 having an outside diameter greater than that of a portion slidably fitted in the support member 34 is formed in a portion of the valve element 33 on the side of the valve seat 32. The pressure acts on the shoulder 49 of the expanded part 48 to press the valve element 33 toward the valve seat 32 in order to prevent the valve element 33 from being raised by the increased internal pressure of the upper chamber 4 acting on the chamfer C of the valve element 33. Therefore, of the pressure receiving area of the chamfer C is less than or equal to the pressure receiving area of the shoulder 49 of the expanded part 48. The chamfer C must be formed in the edge of the valve element 33 to remove burrs formed on the end surface of the valve element 33 during machining.

The valve element 33 can be kept seated on the valve seat 32 even if the internal pressure of either the upper chamber 4 or the lower chamber 5 is increased, because the closing pressure receiving area of the valve element 33 is equal to or greater than the opening pressure receiving area of the same.

Figure 3:
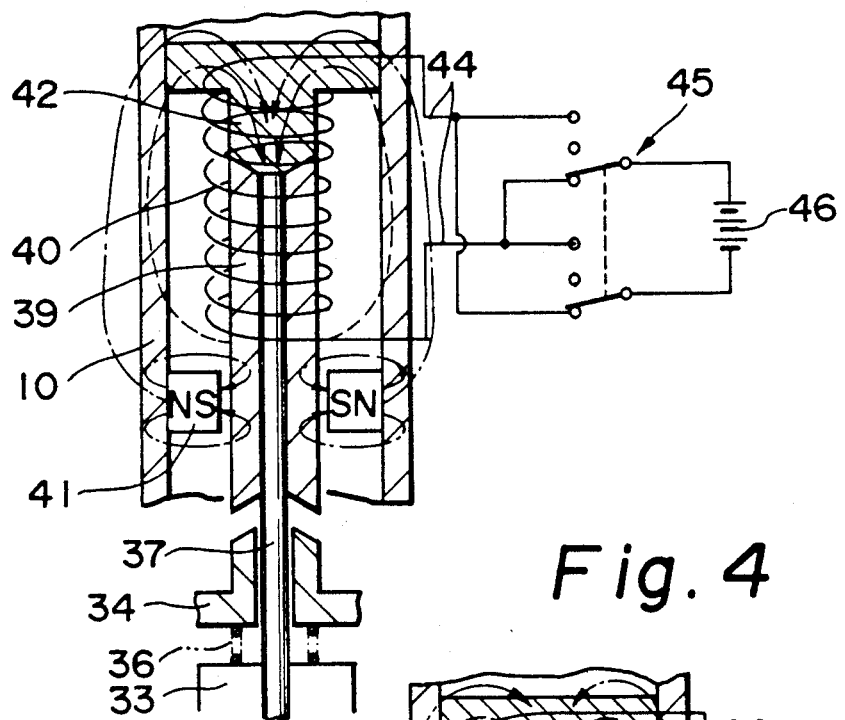
FIGS. 3 and 4 are diagrammatic illustrations of assistance in explaining the operation of the damping force regulating valve shown in FIG. 1.

Functions of the hydraulic shock absorber thus constructed will be described hereinafter. The piston rod 10, the support member 34 and the base 42 form a magnetic path. When the solenoid 40 is connected to the battery 46 as shown in FIG. 3, the solenoid 40 produces a magnetic field of a polarity as represented by broken lines. This magnetic field produced by the solenoid 40 is enhanced by a magnetic field produced by the permanent magnet 41 represented by alternate long and short dash lines, so that the plunger 39 is raised against the resilience of the spring 36 and is attracted to the base 42 and the valve element 33 is separated from the valve seat 32 to open the bypass passage 13. Thereafter, the plunger 39 is held at the raised position by the magnetic field produced by the permanent magnet 41 and hence the valve element 33 is kept separated from the valve seat 32 even if the solenoid 40 is disconnected from the battery 46.

While the bypass passage 13 is open, relatively low damping forces are respectively generated by the damping force generating mechanism 21 provided near the second extension passage 19 of the partition member 18 of the passage unit 8 during the extension stroke of the hydraulic shock absorber 1, and by the damping force generating mechanism 30 provided near the third contraction passage 28 of the valve body 26 of the bottom valve mechanism during the contraction stroke of the hydraulic shock absorber 1.

Figure 4:
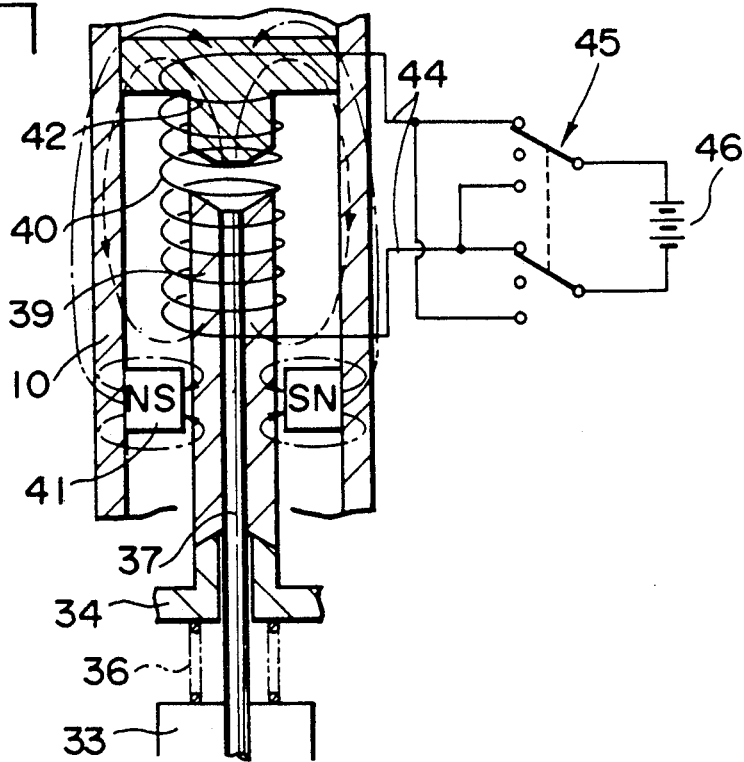

When the solenoid 40 is connected to the battery 46 as shown in FIG. 4, the solenoid 40 produces a magnetic field of a polarity as represented by broken lines. The magnetic field produced by the solenoid 40 and the magnetic field produced by the permanent magnet 41 of a polarity opposite to that of the magnetic field produced by the solenoid 40 cancel out, so that the plunger 39 is biased downwardly by the resilience of the spring 36 to close the bypass passage 13 by seating the valve element 33 on the valve seat 32. Since the rod 37 is able to slide relative to the valve element 33, the rod 37 is able to move downward after the valve element 33 has been seated on the valve seat 32, so that the plunger 39 is able to approach or to come into contact with the support member 34 after the valve element 33 has been seated on the valve seat 32. Accordingly, the plunger 39 is kept attracted to the support member 34 by the agency of the magnetic field produced by the permanent magnet 41, thus keeping the valve element 33 seated on the valve seat 32 as shown in FIG. 1 even if the solenoid 40 is disconnected from the battery 46.

When the bypass passage 13 is thus closed, the first damping force generating mechanism 16 provided near the first extension passage 14 generates a comparatively large damping force in the extension stroke of the hydraulic shock absorber 1. During the contraction stroke of the hydraulic shock absorber 1, a comparatively large damping force, namely, the sum of a damping force generated by the second damping force generating mechanism 17 provided near the first contraction passage 15 of the piston 3 and a damping force generated by the fourth damping force generating mechanism 30 provided near the third contraction passage 28 of the valve body 26 of the bottom valve mechanism 25, is made available.

The pressure of the lower chamber 5 increases during the contraction stroke when the valve element 33 is seated on the valve seat 32. However, the valve element 33 is not raised because the closing pressure receiving area A of the valve element 33 is equal to or greater than the opening pressure receiving area a of the same. Although the pressure of the upper chamber 4 increases during the extension stroke, the valve element 33 is not raised because the closing pressure receiving area of the shoulder 49 of the expanded part 48 of the valve element 33 is equal to or greater than the opening pressure receiving area of the chamfer C of the valve element 33. Thus, the valve element 33 is never unnecessarily raised when the pressure of either the upper chamber 4 or the lower chamber 5 is increased, the biasing force of the spring 36 biasing the valve element 33 in a closing direction may be small, and raising the valve element 33 consumes comparatively little electric energy.

Since the solenoid 40, the permanent magnet 41 and the spring 36 are thus disposed, the bypass passage 13 can be opened or closed according to the direction of the flow of the current supplied to the solenoid 40 to regulate the damping force by moving the plunger 39 by the cooperative action of the magnetic field produced by the solenoid 40, the polarity of which is dependent on the direction of flow of the current supplied to the solenoid 40, and that of the permanent magnet 41. Furthermore, the plunger 39 is kept by the permanent magnet 41 at a position to which the plunger 39 has been moved by the cooperative action of the magnetic fields produced by the solenoid 40 and the permanent magnet 41 even if the solenoid 40 is de-energized after the plunger 39 has been moved to the position.

A hydraulic shock absorber 1a in a second embodiment according to the present invention will be described with reference to FIGS. 5, 6 and 7, in which parts similar or corresponding to those of the hydraulic shock absorber 1 in the first embodiment are denoted by the same reference characters and the description of which will be omitted to avoid duplication. The hydraulic shock absorber 1a is substantially the same in construction as the hydraulic shock absorber 1, except that a damping force regulating valve 12a incorporated into the hydraulic shock absorber 1a is different from the damping force regulating valve 12 incorporated into the hydraulic shock absorber 1.

Figure 5:
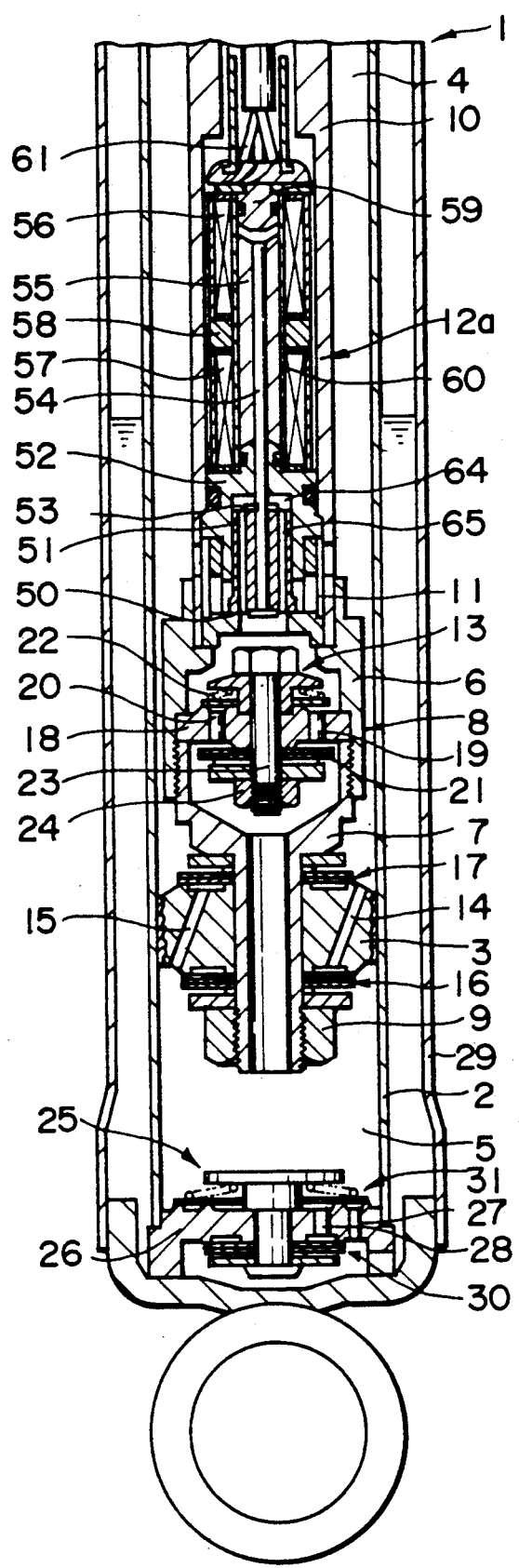
FIG. 5 is a longitudinal sectional view of a variable damping force hydraulic shock absorber in a second embodiment according to the present invention.
Figure 6:
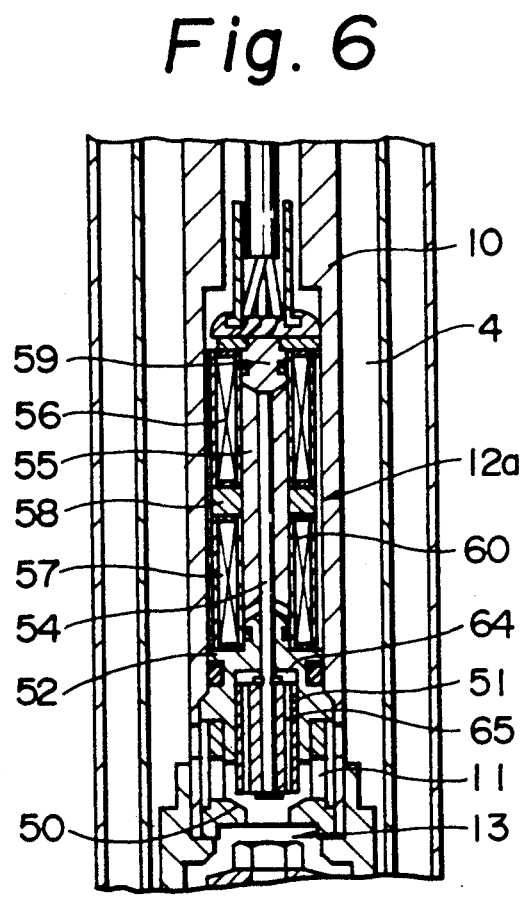
FIG. 6 is a longitudinal sectional view of an essential portion of the variable damping force hydraulic shock absorber of FIG. 5.

Referring to FIGS. 5 and 6, a valve seat 50 is provided in a passage 11 formed in a piston rod 10, and a magnetic support member 52 is fitted in the piston rod 10. A nonmagnetic cylindrical valve element 51 to be seated on the valve seat 50 to block the bypass passage 13 and to be raised from the valve seat 50 to open the bypass passage 13 is slidably fitted in the support member 52 for axial movement in the piston rod 10.

The valve element 51 is mounted on the lower end of a nonmagnetic rod 54 and is restrained from moving an axial direction relative to the rod 54 by a retaining ring 53. The rod 54 extends upward through the support member 52 in the piston rod 10. A magnetic plunger 55 is attached to the upper portion of the rod 54. The plunger 55 is received axially movably in a nonmagnetic sleeve 60. An upper solenoid 56, an annular permanent magnet 58 and a lower solenoid 57 are mounted in that order on the sleeve 60. The inner circumference facing the plunger 55 and outer circumference of the permanent magnet 58 serve as the S pole and the N pole respectively. A magnetic base 59 is disposed over the upper solenoid 56. The axial movement of the plunger 55 is limited by the support member 52 and the base 59. The opposite ends of the sleeve 60 are fitted in a liquid-tight manner respectively in the support member 52 and the base 59.

The valve element 51 is provided with a through hole 65 by means of which a space 64 defined by the valve element 51 and the support member 52 is able to communicate with the bypass passage 13. The working fluid flows through the through hole 65 into the space 64. The valve element 51 is formed so that a closing pressure receiving area, namely, the area of a surface on which the pressure of the lower chamber 5 acts to press the valve element on the valve seat 50, is equal to or greater than an opening pressure receiving area, namely, the area of a surface on which the pressure of the lower chamber 5 acts to raise the valve element 51 from the valve seat 50. Accordingly, the valve element 51 is never unnecessarily separated from the valve seat 50 even when pressure in the bypass passage 13 is increased during the contraction stroke of the hydraulic shock absorber 1a.

The function of the hydraulic shock absorber 1a thus constructed will be described hereinafter.

The piston rod 10, the support member 52 and the base 59 form a magnetic path. When the upper solenoid 56 is connected for energization to a battery 63 as shown in FIG. 7, a magnetic field of a polarity as represented by broken lines is produced. The magnetic field produced by the permanent magnet 58 represented by alternate long and short dash lines cancels the magnetic field produced by the upper solenoid 56 in a region corresponding to the lower solenoid 57 and enhances the magnetic field produced by the upper solenoid 56 in a region corresponding to the upper solenoid 56, so that the plunger 55 is attracted to the base 59; consequently, the valve element 51 is raised from the valve seat 50 to open the bypass passage 13. When the selector switch 62 is opened to disconnect the upper solenoid 56 from the battery 63 after the plunger 55 has been attracted to the base 59, the plunger 55 is kept attracted to the base 59 by the agency of the magnetic field produced by the permanent magnet 58, so that the valve element 51 is kept separated from the valve seat 50 as shown in FIG. 6. The damping force generating action of the hydraulic shock absorber 1a while the bypass passage 13 is open is the same as that of the foregoing hydraulic shock absorber 1 while the bypass passage 13 thereof is open, and hence the description thereof will be omitted.

Figure 7:
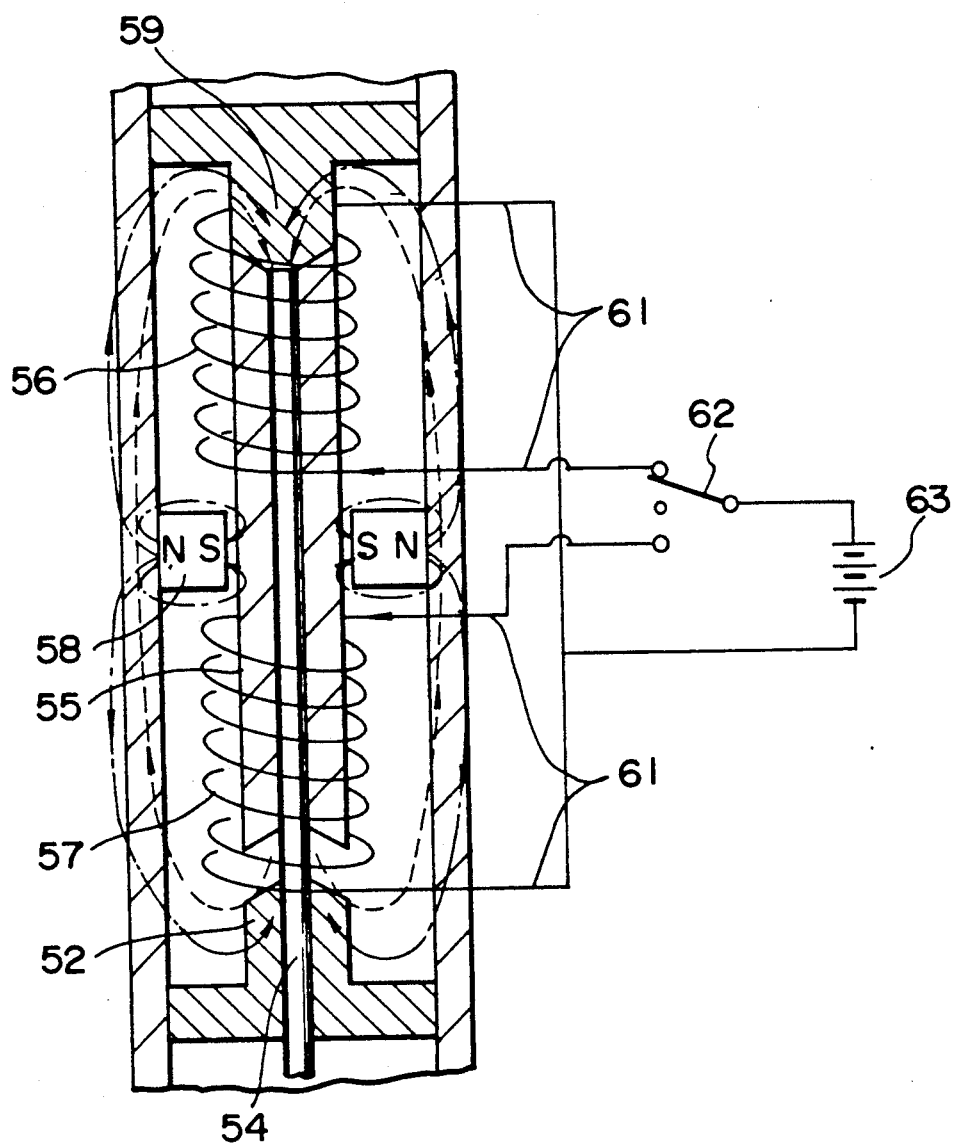
FIG. 7 is a diagrammatic illustration of assistance in explaining the operation of a damping force regulating valve employed in the variable damping force hydraulic shock absorber of FIG. 5.

When the lower solenoid 57 is connected for energization to the battery 63 so as to produce a magnetic field of a polarity opposite that of the magnetic field represented by broken lines in FIG. 7, the magnetic field produced by the permanent magnet 58 cancels the magnetic field produced by the lower solenoid 57 in the region corresponding to the upper solenoid 56 and enhances the magnetic field produced by the lower solenoid 57 in the region corresponding to the lower solenoid 57, so that the plunger 55 is attracted to the support member 52; consequently, the valve element 51 is seated on the valve seat 50 to close the bypass passage 13. When the lower solenoid 57 is de-energized after the plunger has been attracted to the support member 52, the plunger 55 is kept attracted to the support member 52 by the agency of the magnetic field produced by the permanent magnet 58 to keep the valve element 51 seated on the valve seat 50 as shown in FIG. 5. The damping force generating action of the hydraulic shock absorber 1a while the bypass passage 13 is closed is the same as that of the foregoing hydraulic shock absorber 1 while the bypass passage 13 thereof is closed, and hence the description thereof will be omitted.

Thus, the damping force of the hydraulic shock absorber 1a can be regulated by opening or closing the bypass passage 13 by moving the plunger 55 properly by the cooperative action of the magnetic fields of the upper solenoid 56 and the permanent magnet 58 or the magnetic fields of the lower solenoid 57 and the permanent magnet 58. Furthermore, the bypass passage 13 is kept open or closed even if the solenoids 56 and 57 are de-energized after opening or closing the bypass passage 13, because the plunger 55 is held by the permanent magnet 58 at a position to which the same has been moved by the cooperative action of the magnetic fields of the upper solenoid 56 and the permanent magnet 58 or that of the magnetic fields of the lower solenoid 57 and the permanent magnet 58.

The damping force regulating valve employed in the present invention, which regulates the damping force by opening or closing the bypass passage provided in the piston, is applicable also to a hydraulic shock absorber, such as disclosed in Japanese Patent Publication No. 59-22359, which regulates the damping force by selectively opening or closing a passage formed in its bottom valve mechanism.

The valve element of each of the foregoing embodiments can be kept seated on the valve seat or kept separated from the valve seat without using electric energy. However, the application of the valve element employed in the first embodiment, which is formed so that a pressure acting on the valve element to urge the valve element in the opening direction and a pressure acting on the same to urge the same in the closing direction balance with each other, to a conventional hydraulic shock absorber incorporating a solenoid valve which keeps the valve element seated on or separated from the valve seat by electric energy enables the solenoid valve to employ a spring which exerts a reduced force to the valve element to keep the valve element seated on the valve seat, and hence the solenoid valve may be provided with a solenoid having a reduced capacity; consequently, the power consumption of the hydraulic shock absorber can be reduced.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. An adjustable damping force hydraulic shock absorber comprising:
   a cylinder;
   a piston fitted in said cylinder for axial movement and partitioning the interior of said cylinder into two chambers;
   a plurality of passages through which working fluid contained in said cylinder is adapted to flow when said piston moves axially in said cylinder;
   at least one damping force generating mechanism for generating a damping force by controlling the flow of the working fluid through said passages; and
   a damping force regulating valve mechanism for regulating the damping force by opening or closing one specific passage of said plurality of passages;
   said damping force regulating valve mechanism including:
   an axially movable valve element movable between a first position in which it is seated on a valve seat formed in said specific passage and closes said specific passage, and a second position in which it is separated from said valve seat and opens said specific passage;
   a plunger formed of a magnetic material and having opposite ends;
   a solenoid means for selectively moving said plunger in opposite directions when energized, said plunger being axially slidably received in said solenoid means;
   a permanent magnet mounted about said plunger,
   a first abutting member formed of a magnetic material and mounted in opposing relation to one of said opposite ends of said plunger for abutting against said one end of said plunger when said plunger is moved in a first direction;
   a second abutting member formed of a magnetic material and mounted in opposed relation to the other of said opposite ends of said plunger for abutting against said other end of said plunger when said plunger is moved in a second direction opposite said first direction, said permanent magnet, said first abutting member and said second abutting member forming a closed magnetic loop for holding said plunger in abutting relation with said first abutting member after said plunger has been moved into abutting relation with said first abutting member due to a first type of activation of said solenoid means, and for holding said plunger in abutting relation with said second abutting member after it has been moved into abutting relation with said second abutting member due to a second type of activation of said solenoid means;
   a shaft connected at one end thereof to one of said opposite ends of said plunger, said valve element being slidably mounted on the other end of said shaft;

a retaining means, mounted on said other end of said shaft, for retaining said valve element in fixed relation with respect to said shaft and causing said valve element to separate from said valve seat when said plunger is moved in said first direction and abuts against said first abutting member, and for allowing said valve element to slide along said shaft when said plunger is moved in said second direction and said valve element becomes seated on said valve seat so as to allow said plunger to move into abutting relation with said second abutting member; and a biasing means for biasing said valve element toward said valve seat.

2. An adjustable damping force hydraulic shock absorber according to claim 1, wherein said solenoid means comprises a single solenoid adapted to be selectively activated to generate two magnetic fields having opposite polarities.

3. An adjustable damping force hydraulic shock absorber according to claim 1, wherein said solenoid means includes two solenoids adapted to be selectively individually activated to generate respective magnetic fields having opposite polarities.

4. An adjustable clamping force hydraulic shock absorber according to claim 1, wherein
said valve element is formed such that a pressure receiving surface thereof which receives pressure from one of said two chambers in a direction tending to cause said valve element to open said specific passage has a surface area which is less than or equal to a surface area of a pressure receiving surface of said valve element which receives pressure from said one of said two chambers in a direction tending to cause said valve element to close said specific passage, and said valve element is further formed such that a pressure receiving surface thereof which receives pressure from the other of said two chambers in a direction tending to cause said valve element to open said specific passage has a surface area which is less than or equal to a surface area of a pressure receiving surface of said valve element which receives pressure from said other of said two chambers in a direction tending to cause said valve element to close said specific passage.

5. An adjustable clamping force hydraulic shock absorber according to claim 1, further comprising:
a piston rod connected to said piston; and
wherein said specific passage and said damping force regulating valve mechanism are provided in said piston rod.

6. An adjustable clamping force hydraulic shock absorber according to claim 1,
wherein said at least one damping force generating mechanism comprises a first damping force generating mechanism for generating a damping force during extension of said shock absorber when said specific passage is open, and a second damping force generating mechanism for generating a damping force during contraction of said shock absorber when said specific passage is open.

7. An adjustable clamping force hydraulic shock absorber according to claim 6, further comprising:
a check valve means for allowing the working fluid to flow through said specific passage during contraction of said shock absorber but not during extension of said shock absorber.

8. An adjustable clamping force hydraulic shock absorber according to claim 7, wherein
said at least one damping force generating mechanism further comprises a third damping force generating mechanism for generating a damping force during extension of said shock absorber when said specific passage is closed, and a fourth damping force generating mechanism for generating a damping force during contraction of said shock absorber when said specific passage is closed.

* * * * *